United States Patent [19]
Anderson et al.

[11] Patent Number: 5,972,442
[45] Date of Patent: Oct. 26, 1999

[54] STRENGTHENING AGENT, STRENGTHENED METAL HALIDE PARTICLES, AND IMPROVED LAMP FILL MATERIAL

[75] Inventors: Scott Anderson, Champaign; Steve Hansen, Urbana, both of Ill.

[73] Assignee: Advanced Lighting Technologies, Inc., Twinsburg, Ohio

[21] Appl. No.: 08/702,031

[22] Filed: Aug. 23, 1996

[51] Int. Cl.$^6$ ...................................................... H01J 17/26
[52] U.S. Cl. ......................... 428/34.5; 75/255; 313/564; 252/181.1; 252/181.2; 252/181.6; 252/181.7
[58] Field of Search .............................. 75/255; 313/564; 252/181.1, 181.2, 181.6, 181.7; 428/34.5

[56] References Cited

U.S. PATENT DOCUMENTS

| | | | |
|---|---|---|---|
| 3,645,446 | 2/1972 | Patten | 239/14 |
| 3,676,534 | 7/1972 | Anderson | 264/9 |
| 3,948,793 | 4/1976 | Anderson | 252/181.1 |
| 4,171,498 | 10/1979 | Fromm et al. | 313/229 |
| 4,929,869 | 5/1990 | Yonezawa et al. | 313/639 |
| 5,438,244 | 8/1995 | Chang | 315/248 |

*Primary Examiner*—Christopher Raimund
*Attorney, Agent, or Firm*—Rogers & Killeen

[57] ABSTRACT

Particle compositions are described comprising certain metal halides in combination with a strengthening agent. The addition of the strengthening agent to a metal halide particle increases the particle's strength thereby reducing breakage on impact and during handling. When used as a vaporizable metal halide fill in discharge lamps, the particle strength is increased without significantly altering the spectral and electrical characteristics of the lamp. Methods of making the particles and arc tube containing the particles are also disclosed.

74 Claims, 2 Drawing Sheets

STRENGTHENING AGENT, STRENGTHENED METAL HALIDE PARTICLES, AND IMPROVED LAMP FILL MATERIAL

BACKGROUND OF THE INVENTION

Metal halides have a variety of uses, many of which require high purity. They are easily contaminated by water and oxygen and are generally handled in dry boxes.

One of the primary uses of metal halides is as a fill material in the arc tube of electric gas discharge lamps. Such lamps use a variety of fill materials including rare gases, metals, mercury amalgams and metal halides, and the proper operation of such lamps requires that these lamp fill materials contain less than 200 ppm oxygen, preferably less than 50 ppm, and less than 100 ppm hydrogen, preferably less than 20 ppm, and desirably less than 5 ppm.

The proper operation of such lamps also requires that the fill materials be inserted in precisely measured quantities during the fabrication of the lamps. Of particular concern is the vaporizable metal halide fill, generally in the form of pellets or particles. These metal halides determine the electrical and spectral characteristics of a lamp, and it is well known to select particular metal halides and their relative concentrations both to give light of a desired color and to impart desired electrical characteristics to the arc.

A typical metal halide arc tube contains a mixture of metal halides dosed as one or more spherical particles or a cylindrical pellet of precise composition and size.

Various methods are known for manufacturing both spherical uniform composition metal halide particles as shown in FIG. 1 and pellets (i.e., physically aggregated metal halides) as shown in FIG. 2.

If uniform composition and size is desired, the particles of FIG. 1 may be made by the apparatus schematically illustrated in FIG. 3, such apparatus and the manufacturing processes being of the type described, e.g., in the Anderson U.S. Pat. No. 3,676,534 dated July, 1972 and assigned to the assignee of the present invention, the content of which is hereby incorporated by reference.

In the process described in the Anderson patent, uniformly sized particles of metal halide mixtures are formed by forcing a homogeneous melt through an orifice of known diameter at a known velocity and acoustically or electromechanically breaking the molten jet into controlled lengths.

Using this process of controlled jet break up, a mixture of $DyI_3$, $NdI_3$, and CsI with the CsI concentration greater than approximately 35 mole percent, forms particles which are quite weak, if particles are formed at all. These compositions typically have compressive breaking strengths, as measured by crushing a particle between two flat surfaces, of about 25 grams or less.

An alternative process described in the Anderson U.S. Pat. No. 4,201,739 dated May, 1980 and assigned to the assignee of the present invention, the content of which is hereby incorporated by reference. In that Anderson patent, particles are formed by the controlled wetting of an orifice which allows the dripping of molten metal halide spheres of a larger diameter.

Additionally, powders of a variety of metal halides may be aggregated by pressing into a cylindrical pellet or compacted tablet such as illustrated in FIG. 2 in a conventional mechanical device. (See, e.g., Friedrich U.S. Pat. No. 4,248,584). Finally, pellets for use in metal halide arc tubes have been produced by casting or by combining melting and pressing. (See e.g., Schaller U.S. Pat. No. 3,729,247).

It is known that the melting of metal halide mixtures can produce a homogeneous liquid, which if jetted, dropped, cast or pressed as described above, will produce Particles having a bulk composition that is the same as the original molten mixture. When a homogeneous liquid is rapidly frozen and ground into a powder it is in a suitable form for being pressed into a cylindrical or tablet shape.

For efficiency of manufacture, uniformity of dosage, and consistency of the electrical and spectral characteristics of the lamps dosed, it is advantageous to combine several metal halides into a single particle or pellet. Each of these doses must have uniform composition to ensure consistent color and arc characteristics within the lamp and are dosed into the lamp arc tube by various mechanical schemes.

However, the metal halide particles and pellets, without regard to shape, (hereinafter referred to individually and collectively as "Particles") are frequently subjected to considerable mechanical abuse in the various manufacturing, handling, and dosing processes. To routinely withstand the rigors of manufacture, handling, shipping, and dosing the breaking strength of the metal halide particle needs to be greater than about 100 grams as measured by crushing a particle between two parallel surfaces, or through the use of a three point bend test. Certain metal halide mixtures do not form particles or pellets strong enough to withstand this mechanical abuse.

In addition, certain metal halide compositions can not readily be united into a single Particle. For example, a mixture containing iodides of dysprosium, neodymium, and cesium with a cesium content above approximately 35 mole percent could not be pressed into a solid pellet.

One reason for the fragility of metal halide mixtures is phase transformations. For example, a large volume change resulting from freezing of the particle may cause the particle to be in tension on its surface and under compression in its liquid interior. The result is often a particle with a large residual stress, which stress may lead to cracks or cleavage.

Other reasons for the fragility of the particle include the formation of weak and brittle intermediate phases, excessive numbers of cracks or voids, or both, and growth in preferred orientations that are weak.

Breakage on impact may be a significant problem in the formation of particles which are formed by a process in which the particles fall through a cooling tower and impact either the collecting vessel or previously collected particles. Depending on the need for spherical particles, significant waste may thus result in the formation and in the subsequent shipping and handling of such particles.

Without regard to the shape of the Particle being dosed, the implementation of the dosing of lamps with the desired metal halides in the desired quantity to obtain a desired color has heretofore suffered from the imprecision resulting from Particle breakage. Whether the fill is dosed by count or by volume, breaking of the fragile Particles during manufacture, shipment, handling and dosing may result in lamps with electrical and spectral characteristics other than those desired, and variation from lamp to lamp.

In addition to the variations which result from overdosing and underdosing of the lamps, breakage of the Particles may clog the dosing apparatus, disrupting the manufacturing process and wasting an expensive component of the lamps.

Because of the fragility of certain metal halide compositions, there is a great need for a strengthening agent that will not deleteriously affect the intended use of the Particle, e.g., in a lamp the agent must not significantly vary any of the arc characteristics, chemically react with the lamp electrodes, if present, or the walls of the arc tube.

It is thus highly desirable to strengthen the fragile Particles without negatively impacting the electrical and spectral characteristics of the lamp or the various arc tube components such as electrodes.

Attempts to strengthen metal halide particles without the addition of a strengthening agent have been partially successful. Annealing metal halide particles has produced a slight increase in the strength of certain particles, but the success of this procedure has been limited to relatively few materials. By controlling the freezing rate of metal halide particles, a few fragile compositions have been manufactured with improved strengths that allow them to be mechanically dosed. However, neither annealing nor control of freezing rate is universally applicable to metal halides.

It is accordingly an object of the present invention to provide a novel strengthening agent for metal halide Particles, a novel process for strengthening metal halide Particles, and novel compositions of Particles.

Another object of the present invention is to provide a novel composition for, and method of making, vaporizable metal halides useful in gas discharge lamps.

Yet another object of the present invention is to provide an strengthening agent for a vaporizable lamp fill which increases the breakage resistance of the material without significantly affecting the electrical and spectral characteristics of the lamp.

A further object of the present invention to provide a novel breakage resistant composition for metal halide Particles having particular utility as lamp fill material for metal halide lamps.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
FIG. 1 is a schematic representation of one embodiment of the break resistant particle of the present invention.
Figure 2:
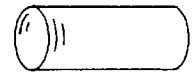
FIG. 2 is a schematic representation of one embodiment of the break resistant pellet of the present invention.
Figure 3:
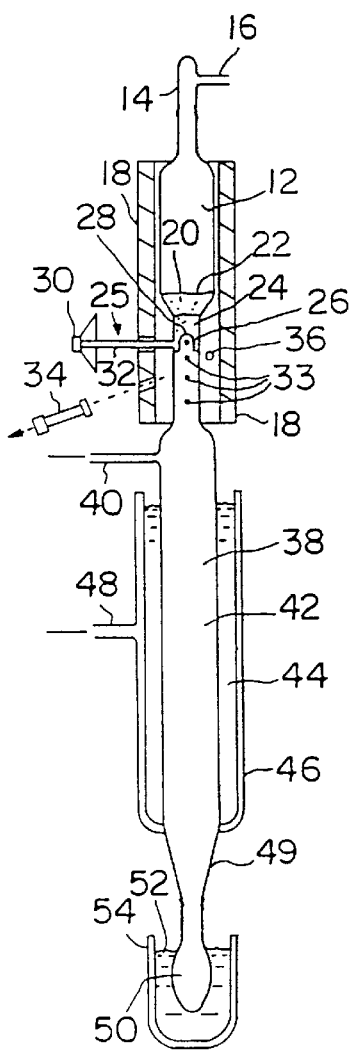
FIG. 3 is an illustration of an apparatus for manufacturing the particles with improved breakage resistance.
Figure 4:
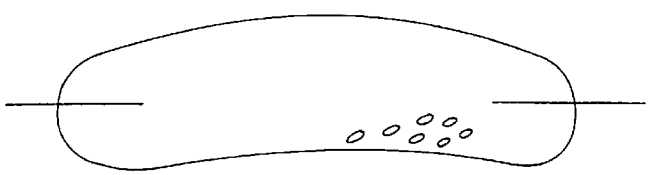
FIG. 4 is a schematic representation of an arc tube incorporating the Particles of the present invention.

While of utility with metal halides generally, the present invention may be easily understood in the embodiment of a vaporizable metal halide fill for use in gas discharge lamps to determine the color characteristics of the lamp. Such fill material may take the form of particles as shown in FIG. 1 or pellets as shown in FIG. 2. Such Particles may be fragile and susceptible to breakage during manufacture, handling, shipping and dosing to produce the arc tubes for gas discharge lamps such as illustrated in FIG. 4.

Particles suitable for use as lamp fill material typically consist of combinations of various metal halides such as dysprosium iodide and neodymium iodide, typically produced as spheres having an average diameter between about 100 and about 3,000 microns, and preferably between about 150 and about 1,200 microns. However, such particles may be produced in the dripping process described above with a diameter between about 1600 and about 3000 microns, preferably between about 1750 and about 2500 microns.

Such lamp fill material may consist of a parent metal halide (alone or in various combinations) from the group consisting of iodides, bromides and chlorides of one or more of the following metals:

Li, Na, K, Rb and Cs in Group 1,

Mg, Ca, Sr and Ba in Group 2,

Sc, Y and La in Group 3,

Ti, Zr and Hf in Group 4,

Nb and Ta in Group 5,

Mn in Group 7,

Fe in Group 8,

Co in Group 9,

Ni in Group 10,

Zn, Cd and Hg in Group 12,

Al, Ga, In and Tl in Group 13,

Sn and Pb in Group 14,

As, Sb and Bi in Group 15,

Te in Group 16,

Ce, Pr, Nd, Sm, Eu, Gd, Tb, Dy, Ho, Er, Tm, Yb and Lu in the Lanthanide Series, and Th in the Actinide Series.

Preferably, lamp fill material may consist of a parent metal halide (alone or in various combinations) from the group consisting of iodides and bromides of one or more of the following metals:

Li, Na, K, Rb and Cs in Group 1,

Sc, Y and La in Group 3,

Fe in Group 8,

Co in Group 9,

Ni in Group 10,

Zn, Cd and Hg in Group 12,

Al, Ga, In and Tl in Group 13,

Sn and Pb in Group 14,

Ce, Pr, Nd, Sm, Eu, Gd, Tb, Dy, Ho, Er, Tm, Yb and Lu in the Lanthanide Series, and Th in the Actinide Series.

It has been found effective to add a small amount of a strengthening agent from Group 11 (Ag, Cu and Au) consisting of one or more the following metal halides $AgI_x$, $AgBr_x$, $AgCl_x$, $CuI_x$, $CuBr_x$, $CuCl_x$, $AuI_x$, $AuBr_x$, and $AuCl_x$, and preferably $AgI$, $AgBr_x$, $CuI$ and $CuBr$, where $0.95<X<1.05$, and preferably $0.99<X<1.01$.

The addition of a strengthening agent is not limited to a particular Group of metal halides or to any mixture of metal halides. For example, it has been found that the addition of copper monoiodide (CuI) or silver monoiodide (AgI), approximately 1.5 mole percent, to a molten metal halide mixture which otherwise produces weak spheres, formed particles typically having a breaking strength 2 to 20 times stronger than those formed without the addition of the strengthening agent.

However, an optimum modifier concentration probably exists for each particular metal halide composition. For example, the addition of 5 mole percent AgI overmodified a mixture of dysprosium, neodymium and cesium iodide causing the mixture to return to a powder.

Copper and silver iodides have been found effective as strengthening agents. The preferred compounds are silver iodide and copper iodide because of their ability to bind iodide mixtures and iodide-bromide mixtures and because their strong emissions are not in the visible wavelengths. Gold iodide and gold halides may also act as strengthening agents, and gold iodide also does not have any significant emission lines in the visible region of the spectrum.

Table 1 shows the color rendition index (CRI), operating voltage, lumens, and color temperature of a metal halide mixture with 2.3 mole percent AgI in the dosed material and the same lamp chacteristics in a control lamp. For different metal halide compositions there are slight variations, on the order of 2 percent, either up or down in the operating parameters of the finished metal halide lamp. Silver iodide has the effect of slightly broadening the arc of the lamp, but has no significant effects on CRI, lumens, and other electrical and spectral properties of the arc.

TABLE NO. 1

100 WATT LAMPS WITH AND WITHOUT AgI IN DOSE
$DyI_3$—$NdI_3$—CsI Doses

| Number | Dose | Operating Voltage | Lumens | Color Temperature | CRI |
| --- | --- | --- | --- | --- | --- |
| 1 | DyNdCsI | 98.3 | 6403 | 6470 | 92.36 |
| 2 | | 98.6 | 6330 | 6429 | 93.32 |
| 3 | | 108.9 | 6631 | 6143 | 88.82 |
| 4 | | 99.4 | 6416 | 5155 | 94.83 |
| 5 | DyNdCsI + | 104.3 | 6038 | 6673 | 93.93 |
| 6 | 2.3 mole | 110.4 | 6258 | 6369 | 94.56 |
| 7 | percent AgI | 106.4 | 6350 | 5728 | 94.99 |

The use of silver iodide and copper iodide as the strengthening agent for metal halide Particles, in amounts from about 0.25 to about 5 mole percent, preferably from about 1.0 to about 1.5 mole percent, are preferred for use in metal halide lamps since the color rendition index and other spectral and electrical measurements of the lamp made from a strengthened particle are not significantly changed.

A further advantage in the use of silver iodide is that its vapor pressure is relatively low at the operating temperature of the metal halide arc tube. A low vapor pressure will help to prevent the silver iodide from becoming an important part of the metal halide arc, particularly the emission spectrum. Moreover, it is known that silver and silver iodide are benign as to an attack on the silica arc tube of a metal halide lamp, i.e., they do not devitrify or etch the walls of the arc tube because silver oxide ($Ag_2O$) is much less stable than silica ($SiO_2$), and the addition of silver metal to the arc tube dose does not accelerate the decomposition of iodides such as sodium iodide (NaI) and neodymium iodide ($NdI_3$) in the lamp. (See the Chang European Patent No. 645 799 A1 and U.S. Pat. No. 5,483,244).

In one embodiment, a small percentage, by weight, of a metal halide additive is added to the "parent" metal halide prior to formation of the particle or pellet. The percentage of the additive is preferentially chosen such that the strength of the resulting Particle is increased without significantly impacting the electrical or spectral characteristics of the lamp. Amounts of additive less than approximately two percent of the Particle weight have been found to advantageously increase the strength of the Particle by a factor of four without significantly impacting the electrical or spectral characteristics of the lamp.

In another embodiment, the addition of a small amount of copper monoiodide (CuI) or silver monoiodide (AgI), approximately 1.5 mole percent, to a molten metal halide mixture which otherwise produces weak spheres, typically produced particles having a breaking strength 2 to 20 times stronger than those formed without the addition of a modifier.

The following are specific examples illustrating the beneficial effects of the strengthening agent.

EXAMPLE 1

A mixture of 75 mole percent sodium bromide and 25 mole percent sodium iodide was jetted as described in the Anderson U.S. Pat. No. 3,676,534 produced a powder that cannot be considered as spheres and which is devoid of breaking strength. The addition of 1.5 mole percent silver iodide (AgI) to the same sodium iodide-sodium bromide melt prior to jetting produced spheres having a breaking strength of 380 g on average, i.e., generally between about 150 g and 450 g.

EXAMPLE 2

The procedure of Example 1 was repeated with a melt consisting of halides of sodium, scandium, and lithium and produced spheres having a breaking strength of 50 g. When the procedure was repeated with the addition of 1.5 mole percent AgI, spheres were produced having a breaking strength between about 100 g and about 200 g, averaging about 180 g.

EXAMPLE 3

The procedure of Example 1 was repeated with the melt consisting of a mixture of tin, thallium and sodium halides. The strength of the particles without annealing was approximately 50 g. When annealed, the strength of the particles increased to about 170 g. When the procedure was repeated with the addition of 1.5 mole percent AgI, the breaking strength of the particles was in the range 400 g–500 g.

EXAMPLE 4

Figure 5:
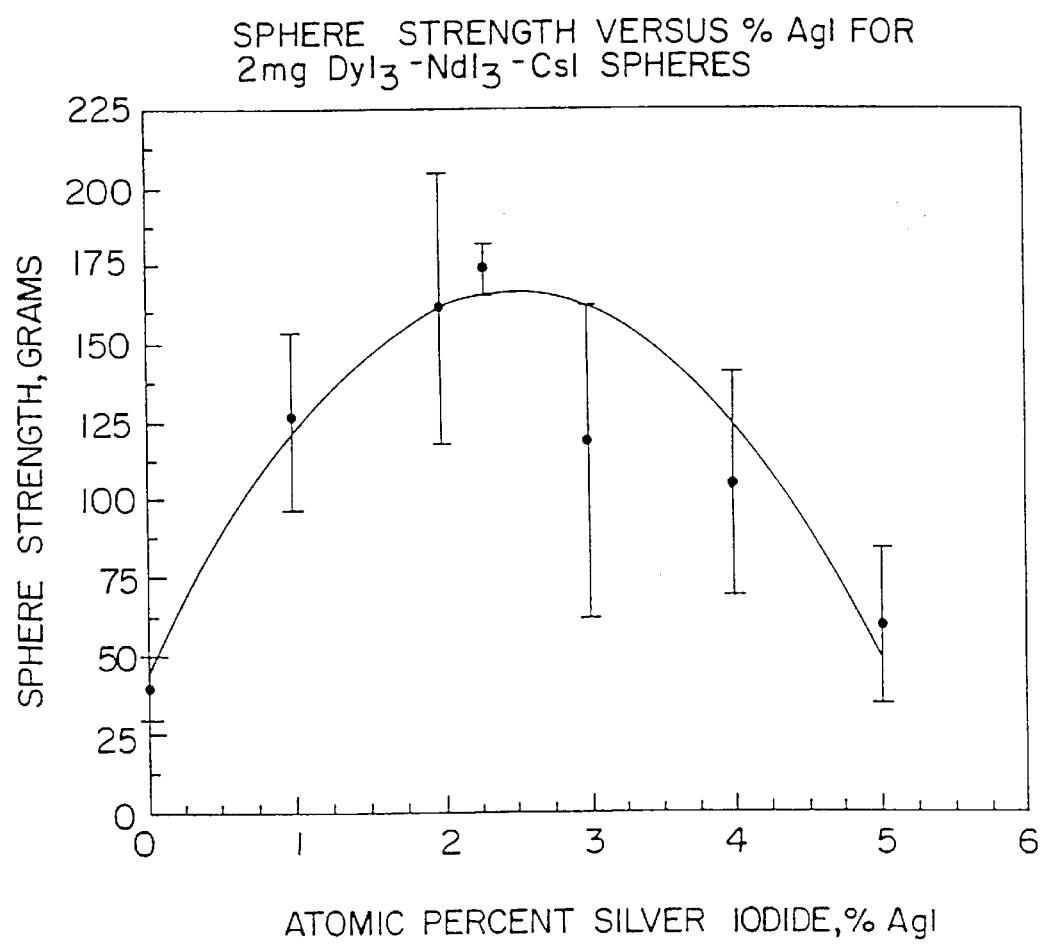
FIG. 5 is a graph of experimental test results showing the optimization of the effects on breaking strength by the addition of the strengthening agent to the parent metal halide.

The procedure of Example 1 was repeated six times with a range of silver iodide additions to the melt. As shown in FIG. 5, the breaking strength of the jetted particles without the addition of the strengthening agent was about 38 g. The breaking strength increased to a maximum of about 175 g in the neighborhood of 2.0–2.5 mole percent AgI, with further increases in AgI reducing the breaking strength of the particles.

To some extent, breaking strength is a function of the size of the Particle, and Particles having a weight between 1.0 and 2.5 mg have generally been used. With such Particles, a breaking strength greater than 100 g is generally required for handling in the dosing of lamps. However, Particles have been produced having a breaking strength of 250 g, 350 g and even 500 g and higher. This generally represents an increase by a factor of at least 1.25, but an increase by a factor of 5, and even 10 to 20, has been experimentally obtained.

The precise mechanism by which the increased breaking strength is achieved may not be fully understood. One probable mechanism for strengthening metal halide spheres by the addition of silver, gold, and copper halides is the ability of these halides to prevent supercooling during freezing. Rapid freezing may be one reason that metal halide structures are weak. In some cases, silver, copper and gold halides may behave as a nucleation site for solidification and prevent large supercooling and the subsequent very rapid solidification from occurring.

A second possible mechanism by which the strengthening occurs is the ability of these strengthening agents to cause solidification in "strong" crystallographic directions rather than in "weak" crystallographic directions. Silver iodide may enhance crystallographic growth in "strong" directions.

A third possible mechanism observed in certain metallic alloys is due to adsorption of the strengthening agent onto one of the phases and the alteration of the normal solidification and growth of this constituent.

In the present invention the modification mechanism may involve either supercooling, preferred growth direction or adsorption, but it is not limited by these mechanisms as an explanation of the strengthening behavior of silver, copper, or gold halides. For each particular metal halide mixture the optimum amount of the strengthening agent is expected to vary within the range from about 0.25 to about 5.0 mole percent, but the present invention is not limited to these composition ranges or to use in the optimum strengthening agent concentration.

The strengthening agent of the present invention may be used as described above in spherical particles, but in certain circumstances it may be advantageous to produce the metal halide Particles in cylindrical shapes as by pressing in a die. Silver halides and silver iodide in particular, when added in amounts between about 0.5 and about 5.0 mole percent, have been found to increase the strength of the compacted powders or pellets above that of the powder when silver iodide or silver halide is not added.

Although the strengthening agents can be employed as monoiodides as herein defined, they may also be present as binary mixtures, AgI and CuI, AgI and AuI, and CuI and AuI, and as ternary mixtures, AgI+AuI+CuI, so long as their collective presence in the final metal halide Particle is in the range from about 0.25 to about 5.0 mole percent, preferably about 1.0 to about 1.5 mole percent.

While the strengthening agent has been described primarily as a monoiodide, the copper, silver, and gold may also be present as monobromides or monochlorides, in any combination and in any concentration ratios. In every instance their total presence is desirably between about 0.5 and about 5.0 mole percent, preferably between about 1.0 and 1.5 mole percent.

Although the parent metal halides which are strengthened are generally made from high purity starting materials, i.e., a purity designated as 99.% to 99.999%, the effectiveness of the strengthening agent is not limited to such high purity ranges. Preferably, both the parent metal halide mixture and the strengthening agent are kept with less than 0.05% water content by weight. However, the present invention is not limited by the moisture level of the starting materials.

The strengthening agent may be introduced into the melt or mechanical press as a halide in any solid form, such as spheres, powders, tablets, or pellets, preferably as a finely divided free flowing solid. However, it may also be introduced in solid metallic form, such as silver spheres or silver pellets, and added to the metal halide mixture with a source of halide, e.g., $X_2$, HX where X is I, Br or Cl.

While a preferred embodiment of the present invention has been described as it relates to vaporizable fill for gas discharge devices, the invention is generally applicable to the strengthening of metal halide pellets or particles and it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An improved particle comprising between about 99.5 and 95.0 mole percent of a first metal halide and between about 0.5 and about 5.0 mole percent of a second metal halide comprising of one or more of iodides, bromides, or chlorides of gold, silver or copper.

2. The particle of claim 1 where the total hydrogen content of the particle is less than about 20 ppm.

3. The particle of claim 1 wherein the breaking strength of the particle is greater than about 100 g.

4. The particle of claim 1 wherein said second metal halide includes a metal from the group consisting of silver and copper and a halide from the group consisting of iodide and bromide;

wherein the total hydrogen content of the particle is less than about 20 ppm;

wherein the total oxygen content of the particle is less than about 50 ppm; and wherein the breaking strength of the particle is greater than about 250 g.

5. The particle of claim 1 further comprising an arc tube having an envelope wherein said particle is contained within said envelope.

6. An improved Particle comprising:

(a) a parent metal halide from the group consisting of one or more of the following halides:
      (i) iodides, (ii) bromides and (iii) chlorides of one or more of the following metals:
      Li, Na, K, Rb and Cs in Group 1,
      Mg, Ca, Sr and Ba in Group 2,
      Sc, Y and La in Group 3,
      Ti, Zr and Hf in Group 4,
      Ta and Nb in Group 5,
      Mn in Group 7,
      Fe in Group 8,
      Co in Group 9,
      Ni in Group 10,
      Zn, Cd and Hg in Group 12,
      Al, Ga, In and Tl in Group 13,
      Sn and Pb in Group 14,
      As, Sb and Bi in Group 15,
      Te in Group 16,
      Ce, Pr, Nd, Sm, Eu, Gd, Tb, Dy, Ho, Er, Tm, Yb, and Lu in the Lanthanide Series, and
      Th in the Actinide Series;

(b) a strengthening agent comprising of one or more metal halides from the group consisting of $AgI_x$, $AgBr_x$, $AgCl_x$, $CuI_x$, $CuBr_x$, $CuCl_x$, $AuI_x$, $AuBr_x$ and $AuCl_x$ where $0.95 < X < 1.05$.

7. The particle of claim 6 wherein the total oxygen content of the particle is less than about 200 ppm.

8. The particle of claim 7 wherein the total oxygen content of the particle is less than about 50 ppm.

9. The particle of claim 6 wherein the total hydrogen content is less than about 100 ppm.

10. The particle of claim 9 wherein the total hydrogen content is less than about 20 ppm.

11. The particle of claim 6 wherein the amount of the strengthening agent is between about 0.5 and about 5.0 mole percent.

12. The particle of claim 11 wherein the amount of the strengthening agent is between about 0.5 and about 1.5 mole percent.

13. The particle of claim 6 wherein the amount of the strengthening agent is sufficient to increase the breaking strength of the particle without the strengthening agent by a factor of at least 1.25.

14. The particle of claim 13 wherein the amount of the strengthening agent is sufficient to increase the breaking strength of the particle without the strengthening agent by a factor of about 5.

15. The particle of claim 14 wherein the amount of the strengthening agent is sufficient to increase the breaking strength of the particle without the strengthening agent by a factor of about 10.

16. The particle of claim 6 comprising a free-flowing sphere of substantially uniform size and composition with a diameter between about 100 microns and about 3000 microns.

17. The particle of claim 16 wherein said diameter is between about 150 microns and about 1,200 microns.

18. The particle of claim 6 wherein said particle is pressurally aggregated.

19. The particle of claim 6 wherein said particle is generally spherical and has a diameter between about 1600 and about 3000 microns.

20. The particle of claim 6 wherein said particle has a breaking strength not less than about 150 g.

21. The particle of claim 6 wherein said strengthening agent is one or more of copper monoiodide or silver monoiodide.

22. The particle of claim 6 wherein the strengthening agent comprises a binary mixture.

23. The particle of claim 6 wherein the strengthening agent consists of a ternary mixture.

24. The particle of claim 6 wherein the parent metal halide is not less that about 90 mole percent of the particle.

25. The particle of claim 6 with a total oxygen content less than about 200 ppm;
with a total hydrogen content less than about 100 ppm;
with a breaking strength greater than about 150 g; and
wherein said strengthening agent comprises between about 0.5 and about 5.0 mole percent.

26. The particle of claim 25 with a total oxygen content less than about 50 ppm;
with a total hydrogen content less than about 20 ppm; and
wherein said strengthening agent comprises between about 1.0 and about 1.5 mole percent.

27. A lamp fill material comprising a particle, said particle comprising:
(a) a parent metal halide from the group consisting of one or more of halides from the group consisting of:
(i) iodides, (ii) bromides and (iii) chlorides of one or more of the following metals:
Li, Na, K, Rb and Cs in Group 1,
Mg, Ca, Sr and Ba in Group 2,
Sc, Y and La in Group 3,
Ti, Zr and Hf in Group 4,
Ta and Nb in Group 5,
Mn in Group 7,
Fe in Group 8,
Co in Group 9,
Ni in Group 10,
Zn, Cd and Hg in Group 12,
Al, Ga, In and Tl in Group 13,
Sn and Pb in Group 14,
As, Sb and Bi in Group 15,
Te in Group 16,
Ce, Pr, Nd, Sm, Eu, Gd, Tb, Dy, Ho, Er, Tm, Yb, and Lu in the Lanthanide Series, and
Th in the Actinide Series; and
(b) a strengthening agent comprising one or more metal halides from the group consisting of $AgI_x$, $AgBr_x$, $AgCl_x$, $CuI_x$, $CuBr_x$, $CuCl_x$, $AuI_x$, $AuBr_x$ and $AuCl_x$ where $0.95<X<1.05$.

28. The particle of claim 26 wherein the total oxygen content of the material is less than about 200 ppm.

29. The material of claim 28 wherein the total oxygen content of the material is less than about 50 ppm.

30. The material of claim 29 wherein the total hydrogen content is less than about 5 ppm.

31. The particle of claim 26 wherein the total hydrogen content of the material is less than about 20 ppm.

32. The material of claim 31 wherein the total hydrogen content is less than about 5 ppm.

33. A lamp fill material comprising:
(a) a parent metal halide from the group consisting of one or more of halides from the group consisting of:
(i) iodides, (ii) bromides and (iii) chlorides of one or more of the following metals:
Li, Na, K, Rb and Cs in Group 1,
Mg, Ca, Sr and Ba in Group 2,
Sc, Y and La in Group 3,
Ti, Zr and Hf in Group 4,
Ta and Nb in Group 5,
Mn in Group 7,
Fe in Group 8,
Co in Group 9,
Ni in Group 10,
Zn, Cd and Hg in Group 12,
Al, Ga, In and Tl in Group 13,
Sn and Pb in Group 14,
As, Sb and Bi in Group 15,
Te in Group 16,
Ce, Pr, Nd, Sm, Eu, Gd, Tb, Dy, Ho, Er, Tm, Yb, and Lu in the Lanthanide Series, and
Th in the Actinide Series; and
(b) a strengthening agent comprising one or more metal halides from the group consisting of $AgI_x$, $AgBr_x$, $AgCl_x$, $CuI_x$, $CuBr_x$, $CuCl_x$, $AuI_x$, $AuBr_x$ and $AuCl_x$ where $0.95<X<1.05$;
wherein the amount of the strengthening agent is between about 0.5 and about 5.0 mole percent, said lamp fill material being suitable for introduction before the lamp is fired as lamp fill material into an unfired arc tube.

34. The material of claim 33 wherein said parent metal halide having one or more halides from the group consisting of iodide and bromide, and one or more metals taken from the group consisting of:
Li, Na, K, Rb and Cs in Group 1,
Sc, Y and La in Group 3,
Fe in Group 8,
Co in Group 9,
Ni in Group 10,
Zn, Cd and Hg in Group 12,
Al, Ga, In and Tl in Group 13,
Sn and Pb in Group 14,
Ce, Pr, Nd, Sm, Eu, Gd, Tb, Dy, Ho, Er, Tm, Yb and Lu in the Lanthanide Series, and
Th in the Actinide Series.

35. The material of claim 33 wherein said material comprises a mixture of the iodides of dysprosium, neodymium, and cesium with a cesium content above about 35 mole percent.

36. The material of claim 33 wherein said parent halide is 70–80 mole percent sodium bromide and 30–20% sodium iodide.

37. The material of claim 33 wherein the total oxygen content of the particle is less than about 200 ppm and the total hydrogen content of the material is less than 20 ppm.

38. The material of claim 33 wherein the amount of the strengthening agent is between about 0.5 and about 1.5 mole percent.

39. The material of claim 27 wherein the parent metal halide comprises not less that about 90 mole percent of the particle.

40. The material of claim 27 wherein the amount of the strengthening agent is sufficient to increase the breaking strength of the material without the strengthening agent by a factor of at least 1.50.

41. The material of claim 40 wherein the amount of the strengthening agent is sufficient to increase the breaking strength of the material without the strengthening agent by a factor of about 10.

42. The material of claim 27 wherein said material has a breaking strength not less than about 100 g.

43. The material of claim 42 wherein said material has a breaking strength not less than about 250 g.

44. The material of claim 43 wherein said material has a breaking strength not less than about 500 g.

45. The material of claim 27 comprising a free-flowing sphere of substantially uniform size and composition with a diameter between about 100 microns and about 3000 microns.

46. The material of claim 45 wherein said diameter is between about 150 microns and about 1,200 microns.

47. The material of claim 27 wherein said material is pressurally aggregated.

48. The material of claim 27 wherein said material is generally spherical and has a diameter between about 1600 and about 3000 microns.

49. The material of claim 27 wherein said material comprises a mixture of the iodides of dysprosium, neodymium, and cesium with a cesium content above about 35 mole percent.

50. The material of claim 49 wherein said material has a breaking strength not less than about 350 g.

51. The material of claim 27 wherein said parent halide is 70–80 mole percent sodium bromide and 30–20% sodium iodide;

wherein said strengthening agent is 1.5 mole percent silver iodide; and wherein the breaking strength is not less than about 350 g.

52. The material of claim 27 wherein the parent halide consists of one or more halides of the group consisting of sodium, scandium and lithium;

wherein the strengthening agent is 1.5 mole percent silver iodide; and wherein the breaking strength is not less than about 180 g.

53. The material of claim 27 wherein the parent halide comprises one or more halides of the group comprising tin, thallium and sodium;

wherein the strengthening agent is 1.5 mole percent silver iodide; and wherein the breaking strength is greater than the breaking strength of the parent halide by a factor greater than three.

54. A lamp fill material comprising:
(a) a parent metal halide from the group consisting of one or more of halides from the group consisting of:
(i) iodides, (ii) bromides and (iii) chlorides of one or more of the following metals:
Li, Na, K, Rb and Cs in Group 1,
Mg, Ca, Sr and Ba in Group 2,
Sc, Y and La in Group 3,
Ti, Zr and Hf in Group 4,
Ta and Nb in Group 5,
Mn in Group 7,
Fe in Group 8,
Co in Group 9,
Ni in Group 10,
Zn, Cd and Hg in Group 12,
Al, Ga, In and Tl in Group 13,
Sn and Pb in Group 14,
As, Sb and Bi in Group 15,
Te in Group 16,
Ce, Pr, Nd, Sm, Eu, Gd, Tb, Dy, Ho, Er, Tm, Yb, and Lu in the Lanthanide Series, and
Th in the Actinide Series; and
(b) a strengthening agent comprising one or more metal halides from the group consisting of $CuI_x$, $CuBr_x$, $CuCl_x$, $AuI_x$, $AuBr_x$ and $AuCl_x$ where $0.95<X<1.05$.

55. The material of claim 54 wherein the halide in said strengthening agent is an iodide.

56. A lamp fill material comprising:
(a) a parent metal halide from the group consisting of one or more of halides from the group consisting of:
(i) iodides, (ii) bromides and (iii) chlorides of one or more of the following metals:
Li, Na, K, Rb and Cs in Group 1,
Mg, Ca, Sr and Ba in Group 2,
Sc, Y and La in Group 3,
Ti, Zr and Hf in Group 4,
Ta and Nb in Group 5,
Mn in Group 7,
Fe in Group 8,
Co in Group 9,
Ni in Group 10,
Zn, Cd and Hq in Group 12,
Al, Ga, In and Tl in Group 13,
Sn and Pb in Group 14,
As, Sb and Bi in Group 15,
Te in Group 16,
Ce, Pr, Nd, Sm, Eu, Gd, Tb, Dy, Ho, Er, Tm, Yb, and Lu in the Lanthanide Series, and
Th in the Actinide Series; and
(b) a strengthening agent comprising one or more metal halides from the group consisting of $AgI_x$, $AgBr_x$, $AgCl_x$, $CuI_x$, $CuBr_x$, $CuCl_x$, $AuI_x$, $AuBr_x$ and $AuCl_x$ where $0.95<X<1.05$;

wherein said strengthening agent comprises a binary mixture.

57. The material of claim 56 wherein the amount of the strengthening agent is between about 0.5 and about 5.0 mole percent.

58. The material of claim 56 wherein said parent metal halide having one or more halides from the group consisting of iodide and bromide, and one or more metals taken from the group consisting of:
Li, Na, K, Rb and Cs in Group 1,
Sc, Y and La in Group 3,
Fe in Group 8,
Co in Group 9,
Ni in Group 10,
Zn, Cd and Hg in Group 12,
Al, Ga, In and Tl in Group 13,
Sn and Pb in Group 14,
Ce, Pr, Nd, Sm, Eu, Gd, Tb, Dy, Ho, Er, Tm, Yb and Lu in the Lanthanide Series, and
Th in the Actinide Series.

59. The material of claim 56 wherein the parent halide consists of one or more halides of the group consisting of sodium, scandium and lithium.

60. The material of claim 56 wherein the parent halide comprises one or more halides of the group comprising tin, thallium and sodium.

61. A lamp fill material comprising:
(a) a parent metal halide from the group consisting of one or more of halides from the group consisting of:
(i) iodides, (ii) bromides and (iii) chlorides of one or more of the following metals:
Li, Na, K, Rb and Cs in Group 1,
Mg, Ca, Sr and Ba in Group 2,
Sc, Y and La in Group 3,
Ti, Zr and Hf in Group 4,
Ta and Nb in Group 5,
Mn in Group 7,
Fe in Group 8,
Co in Group 9,
Ni in Group 10,
Zn, Cd and Hq in Group 12,
Al, Ga, In and Tl in Group 13,
Sn and Pb in Group 14,
As, Sb and Bi in Group 15,
Te in Group 16,
Ce, Pr, Nd, Sm, Eu, Gd, Tb, Dy, Ho, Er, Tm, Yb, and Lu in the Lanthanide Series, and
Th in the Actinide Series; and
(b) a strengthening agent comprising one or more metal halides from the group consisting of $AgI_x$, $AgBr_x$, $AgCl_x$, $CuI_x$, $CuBr_x$, $CuCl_x$, $AuI_x$, $AuBr_x$ and $AuCl_x$ where $0.95<X<1.05$;
wherein said strengthening agent consists of a ternary mixture.

62. The material of claim 54 wherein said strengthening agent comprises one or more halides from the group consisting of iodide and bromide, and one or more metals taken from the group consisting of silver and copper.

63. The material of claim 54 wherein said parent metal halide having one or more halides from the group consisting of iodide and bromide, and one or more metals taken from the group consisting of:
Li, Na, K, Rb and Cs in Group 1,
Sc, Y and La in Group 3,
Co in Group 9,
Ni in Group 10,
Zn, Cd and Hg in Group 12,
Al, Ga, In and Tl in Group 13,
Sn and Pb in Group 14,
Ce, Pr, Nd, Sm, Eu, Gd, Tb, Dy, Ho, Er, Tm, Yb and Lu in the Lanthanide Series, and
Th in the Actinide Series.

64. The material of claim 63 wherein said strengthening agent comprises one or more halides from the group consisting of iodide and bromide, and one or more metals taken from the group consisting of silver and copper.

65. The material of claim 64 wherein the total oxygen content of the material is less than about 50 ppm; and wherein the total hydrogen content is less than about 5 ppm.

66. The material of claim 27 wherein the amount of the strengthening agent is between about 1.0 and about 1.5 mole percent; and
wherein said material has a breaking strength not less than about 100 g.

67. An arc tube for a metal halide lamp including an envelope containing fill material determinative of the electrical and spectral characteristics of the lamp, said material comprising a particle including first and second metal halides,
said first metal halide having one or more halides from the group consisting of iodide and bromide, and one or more metals taken from the group consisting of silver and copper, and
said second metal halide having one or more halides from the group consisting of iodide and bromide, and one or more metals taken from the group consisting of:
Li, Na, K, Rb and Cs in Group 1,
Sc, Y and La in Group 3,
Fe in Group 8,
Co in Group 9,
Ni in Group 10,
Zn, Cd and Hg in Group 12,
Al, Ga, In and Tl in Group 13,
Sn and Pb in Group 14,
Ce, Pr, Nd, Sm, Eu, Gd, Tb, Dy, Ho, Er, Tm, Yb and Lu in the Lanthanide Series, and
Th in the Actinide Series;
wherein said first metal halide is between about 0.5 and about 5.0 mole percent.

68. The arc tube of claim 67 wherein said fill material contains less than about 5 ppm hydrogen and less than about 20 ppm oxygen.

69. The arc tube of claim 68 wherein said first halide is between about 1.0 and about 1.5 mole percent.

70. The arc tube of claim 67 wherein said first halide is between about 1.0 and about 1.5 mole percent.

71. An arc tube for a metal halide lamp including an envelope containing fill material determinative of the electrical and spectral characteristics of the lamp, said material including first and second metal halides,
said first metal halide having one or more halides from the group consisting of iodide and bromide, and one or more metals taken from the group consisting of copper and gold; and
said second metal halide having one or more halides from the group consisting of iodide and bromide, and one or more metals taken from the group consisting of:
Li, Na, K, Rb and Cs in Group 1,
Sc, Y and La in Group 3,
Co in Group 9,
Ni in Group 10,
Zn, Cd and Hg in Group 12,
Al, Ga, In and Tl in Group 13,
Sn and Pb in Group 14,
Ce, Pr, Nd, Sm, Eu, Gd, Tb, Dy, Ho, Er, Tm, Yb and Lu in the Lanthanide Series, and
Th in the Actinide Series.

72. The arc tube of claim 71 wherein said fill material contains less than about 5 ppm hydrogen and less than about 20 ppm oxygen.

73. The arc tube of claim 71 wherein said first metal halide is between about 0.5 and about 5.0 mole percent.

74. The arc tube of claim 73 wherein said first metal halide is between about 1.0 and about 1.5 mole percent.

* * * * *